(12) United States Patent
Liu (10) Patent No.: US 6,383,111 B1
(45) Date of Patent: May 7, 2002

(54) DOUBLE USE INNER BRAKE AND AN INNER DERAILLEUR FOR BIKES

(76) Inventor: Jen-Chih Liu, 2F., No. 468 Chien Kuo 1 Road, Kaohsiung (TW)

( * ) Notice: Subject to any disclaimer, the term of this patent is extended or adjusted under 35 U.S.C. 154(b) by 0 days.

(21) Appl. No.: 09/618,383

(22) Filed: Jul. 18, 2000

(51) Int. Cl.[7] ................................. F16H 3/44
(52) U.S. Cl. ..................... 475/276; 475/289
(58) Field of Search ................. 475/276, 278, 475/285, 288, 289, 296, 299, 314, 339, 340

(56) References Cited

U.S. PATENT DOCUMENTS

| | | | | |
|---|---|---|---|---|
| 4,721,013 A | * | 1/1988 | Steuer et al. | 475/289 |
| 5,078,664 A | * | 1/1992 | Nagano | 475/296 X |
| 5,273,500 A | * | 12/1993 | Nagano | 475/296 X |
| 5,399,128 A | * | 3/1995 | Nurnberger | 475/299 X |
| 5,443,279 A | * | 8/1995 | Nurnberger | 475/289 X |
| 5,562,563 A | * | 10/1996 | Shoge | 475/289 X |
| 5,855,530 A | * | 1/1999 | Huang et al. | 475/288 X |
| 5,863,270 A | * | 1/1999 | Chen et al. | 475/289 |
| 5,964,979 A | * | 10/1999 | Matsuo et al. | 475/296 X |

FOREIGN PATENT DOCUMENTS

GB  2249364  * 5/1992  ............. 475/296

* cited by examiner

*Primary Examiner*—Charles A. Marmor
*Assistant Examiner*—Roger Pang
(74) *Attorney, Agent, or Firm*—Pro-TECHTOR International Services (57) ABSTRACT

A double use inner brake and an inner derailleur for bikes include a post frame, plural posts and plural brake plates in the inner brake. The post frame receives reverse direction power output from an inner gear of the inner derailleur and by pulling a hand brake to move the plural posts push the brake plates outward to produce braking function. Thus the inner brake is controlled by two kinds of braking modes.

10 Claims, 7 Drawing Sheets

DOUBLE USE INNER BRAKE AND AN INNER DERAILLEUR FOR BIKES

BACKGROUND OF THE INVENTION

This invention relates to a double use inner brake and an inner derailleur for bikes, particularly to one possible to perform brake action by a reverse direction power output of the inner derailleur or by a hand brake. The inner brake has a post frame rotatable and plural posts and brake plates, and the post frame receives reverse direction output of an inner gear of the inner derailleur or pulling of the hand brake to rotate to force the plural posts to move and push the brake plates outward to contact and stop the brake hub, having two kinds of braking modes.

Conventional bikes have various kinds for use, such as for racing, mountaineering, or going to work or exercise. Traditionally, in order to save force and fast running, an outer speed changer (various speed changing chain wheels) is fixed on a rear wheel shaft, exposing the speed changing chain wheels so that dirt and dust may attach them to affect regular function of them and shorten their service life. So bike makers in the world engage in research and development of inner derailleurs. Traditional bikes also have a brake hub fixed at one side of the rear wheel shaft and controlled by a hand brake with a wire, so dirt and dust may attach on the brake hub to affect normal function. Thus inner derailleurs have been disclosed.

The braking mode utilizing reverse direction power action of an inner derailleur to produce braking function is a well-known art, and disclosed in many US patents suchs as U.S. Pat. Nos. 4,059,028, 4,063,469, 4,119,182, 4,147,243, 4,147,244, 4,160,393, 4,179,953, 4,240,533, 4,323,146, 4,651,853, 4,721,013, etc.

From those documents a coaster brake is found to have reverse stepping braking mode, utilizing reverse direction power output of an inner derailleur to produce braking function. And every case has its own design and idea a little different from one another, but not so ideal from the point of structure too complicated.

SUMMARY OF THE INVENTION

This invention has thus been devised to offer a kind of double use brake and an inner derailleur, having the following features.
1. Supplying an inner brake having a sharp braking effect.
2. Supplying a structure quickly transmitting power directly to an inner brake and an inner derailleur.
3. Supplying a double use inner brake by selecting braking either by reversely stepping a pedal or by controlling a hand brake.
4. Supplying an inner brake possible to produce braking function by reverse pedaling and controlling a hand brake, having more than one braking ways to get complimentary safety gain.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
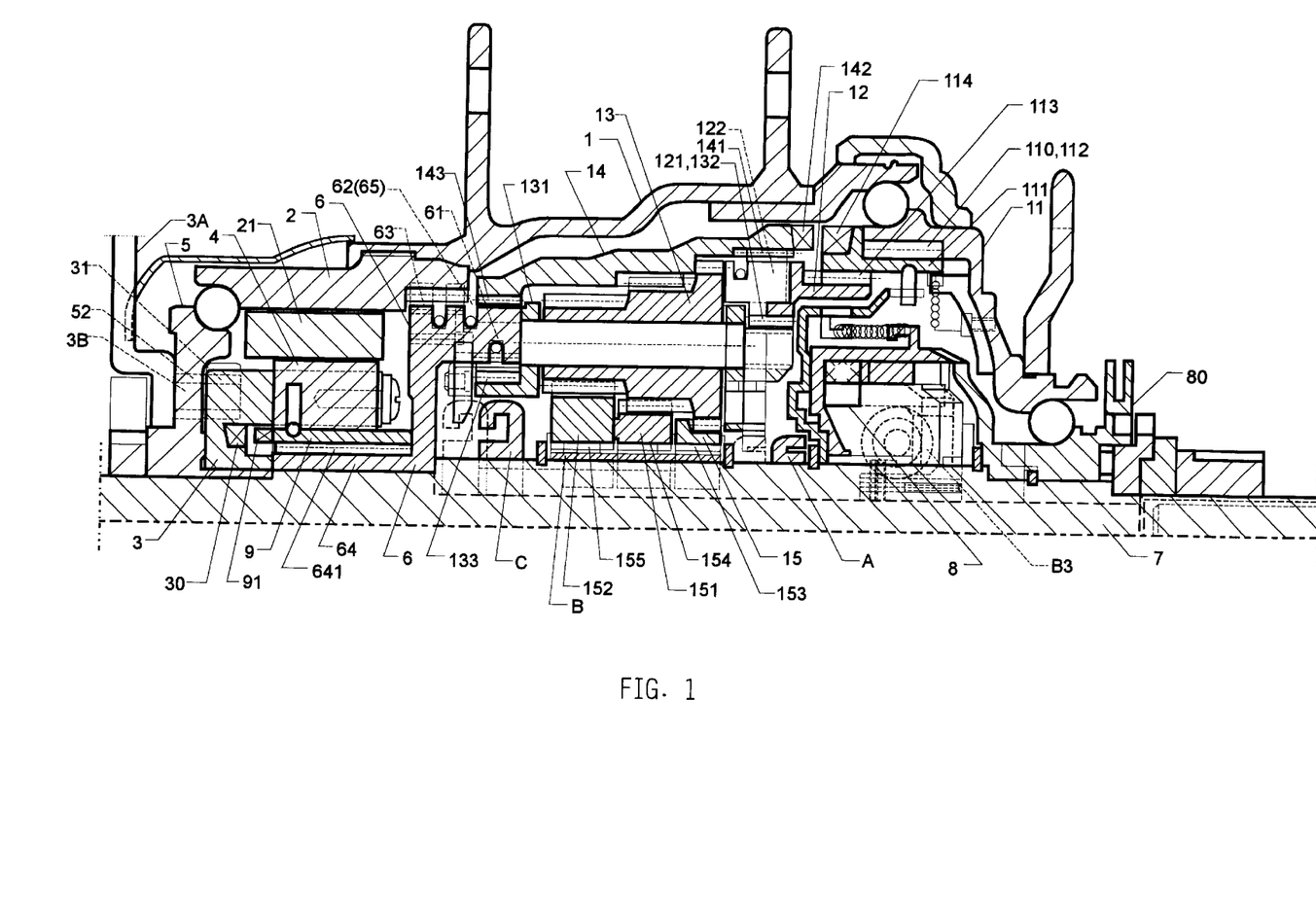
FIG. 1 is a cross sectional view of a double use inner brake and an inner derailleur in the present invention.
Figure 2:
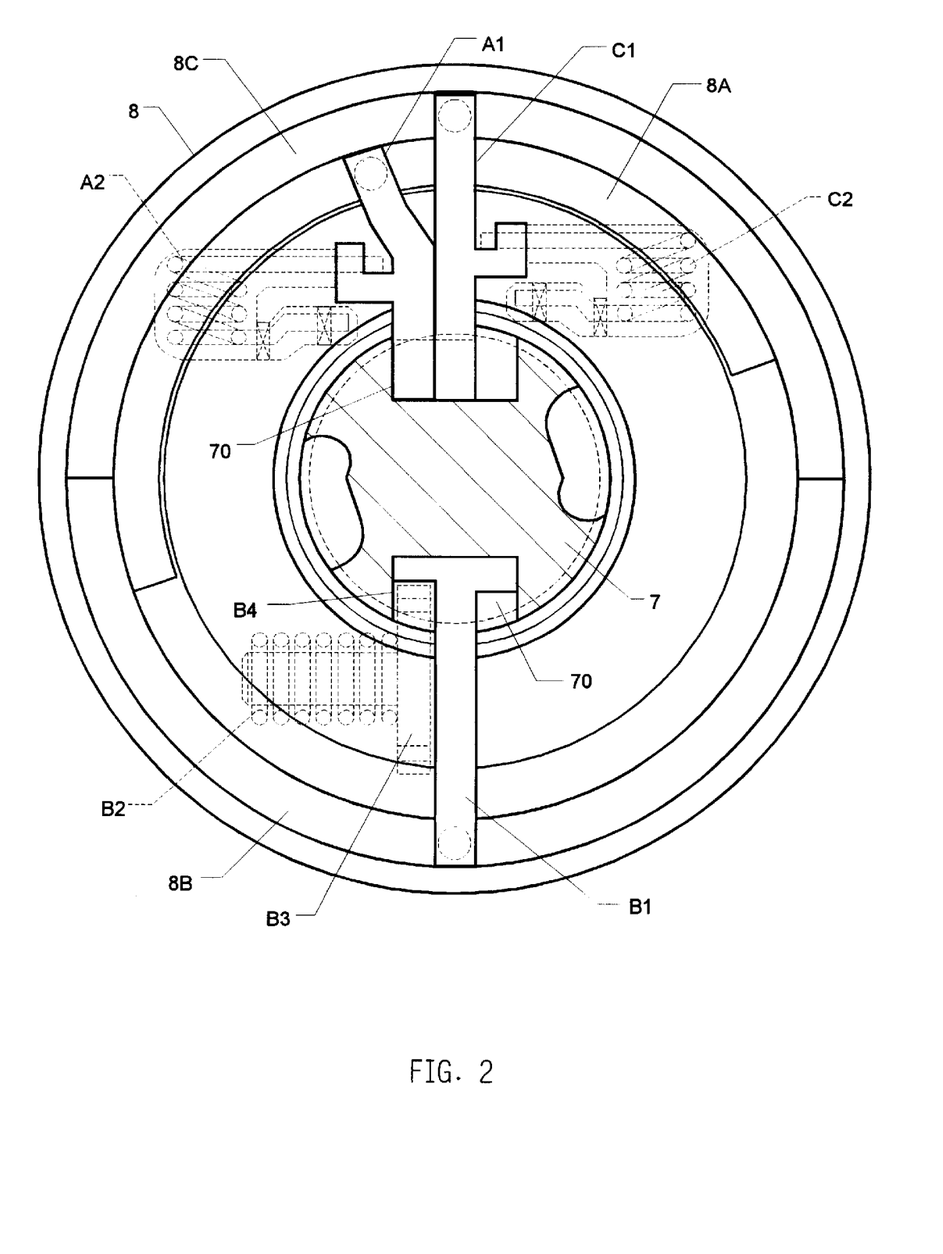
FIG. 2 is a front view of a flat protruding wheel in the present invention.
Figure 3:
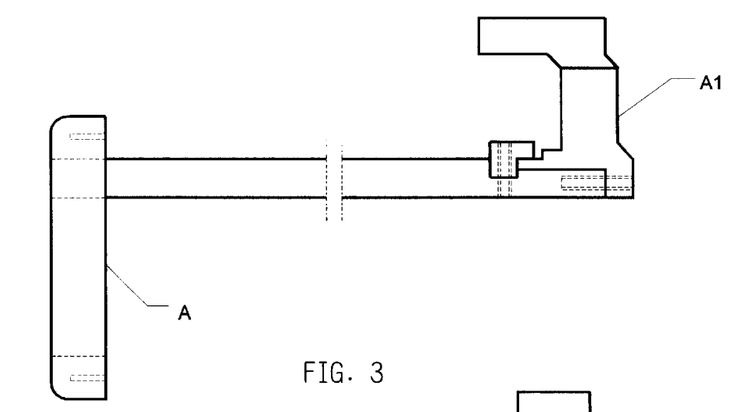
FIG. 3 is a side view of a first control rod (A1) and a first ring (A) in the present invention.
Figure 4:
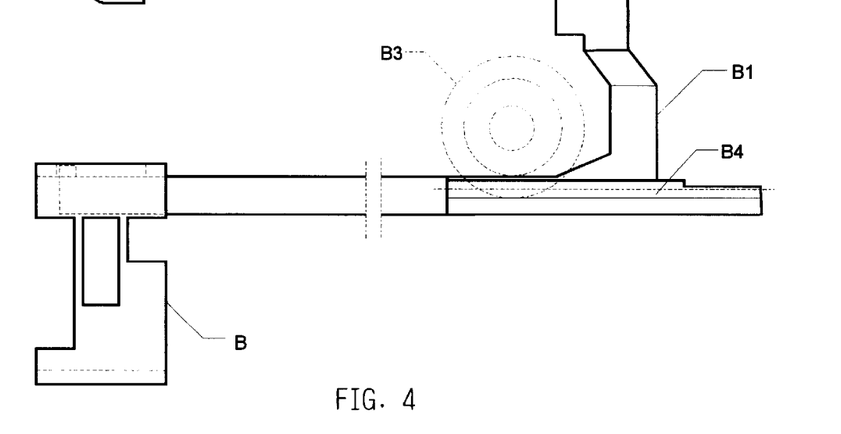
FIG. 4 is a side view of a second control rod (B1) and a second ring (B) in the present invention.
Figure 5:
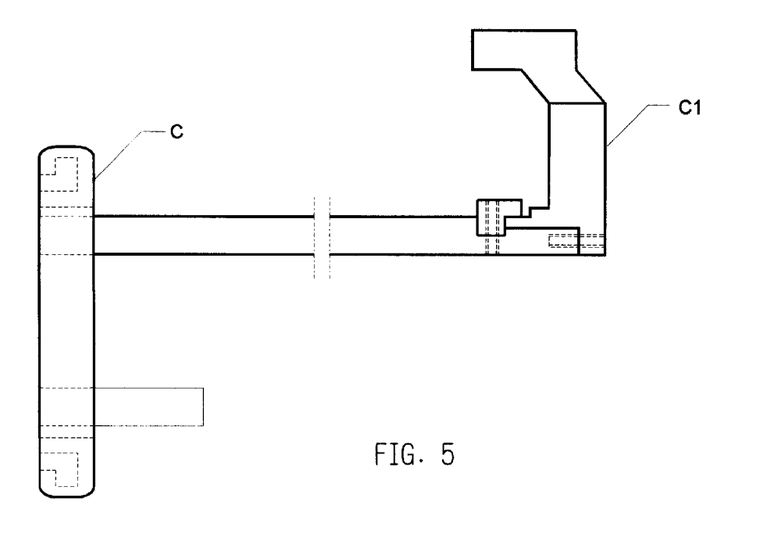
FIG. 5 is a side view of a third control rod (C1) and a third ring (C) in the present invention.

A preferred embodiment of a double use inner brake and an inner derailleur for bikes in the present invention, as shown in FIG. 1, are provided in a hub (1), including a power input member (11) of an inner derailleur, a reverse direction power output slide ring (111), an output selecting ring (12), a planetary gear (13), a planetary gear frame (131), an inner gear (14), a sun gear unit, an inner brake hub (2), plural brake plates (21), a post frame (3), plural posts (4), a side end cover 5, a middle ring 6 located between an output end of the inner derailleur and the post frame (3), a fix shaft (7), a flat protruding wheel (8) for operating speed change, plural control rods and plural rings, as main components.

Figure 6:
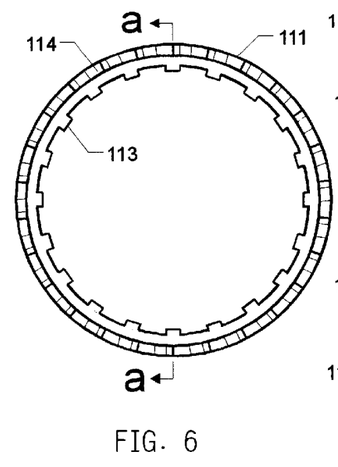
FIG. 6 is a front view of a power output slide ring (111) in the present invention.
Figure 7:
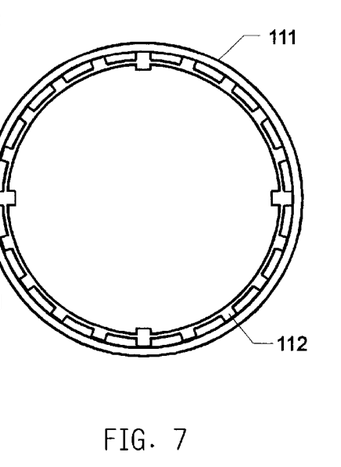
FIG. 7 is a rear view of FIG. 6.
Figure 8:
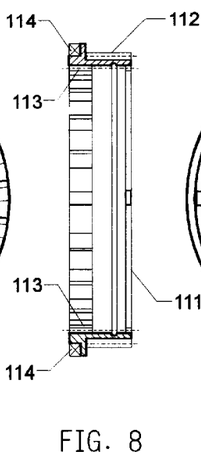
FIG. 8 is a cross-sectional view of the line a—a in FIG. 6.

The power input member (11) has an output end provided with a slanting tooth (110) engaging and moving with the reverse direction power output slide ring (111). When the power input member (11) rotates in clockwise direction, the power output slide ring (111) does not slide out, engaging and moving with the output select ring (12). The reverse direction power output slide ring (111) has a slanting tooth (112) at an input end engaging and moving with the slanting tooth (110) of the power input member (11), as shown in FIGS. 6–8, and a tooth (113) engaging the output select ring (12) and a single direction tooth (114) at an output end engaging and moving with the inner gear (14). When the power input member (11) rotates in the reverse direction, the slide ring (111) moves out horizontally to let the tooth (113) and (114) respectively engage and move with the output select ring (12) and the inner gear (14).

The planetary gear (13) is located on the planetary gear frame (131), engaging the plural sun gears (15), (151), (152) and moves around the fix shaft (7). The planetary gear frame (131) has an engage section (132) at the input end engaging with the engage section (121) of the output end of the output select ring (12), which has a detent (122) at the input end selectably engage and move with an engage section (141) at the input end of the inner gear (14). The inner gear (14) has an engage section (142) at the output end to engage the tooth (114) of the slide ring (111). The planetary gear frame (131) has an engage section (133) at the output end to engage a detent (61) formed in an inner edge of the input end of the middle ring (6). The inner gear (14) has an engage section (143) to engage a clockwise direction detent (62) or a reverse direction detent (65) formed on an outer edge of the input end of the middle ring (6).

The detent (122) of the output end of the output select ring (12) is controlled by a first ring (A) to become ON or OFF, and a first control rod (A1) positioned in a groove (70) of the fix shaft (7) moves the first ring (A) horizontally, having the other end pushed by a first coil spring (A2) to move on a first annular surface (8A) of the flat protruding wheel (8) rotated by the speed change control structure (80), so the first control rod (A1) may move along the high and low condition of the first annular surface (8A), moving the first ring (A) horizontally to make the detent (122) ON or OFF.

A second ring (B) controlling the sun gears (15), (151), (152) has three notches to respectively control a first detent (153), a second detent (154) and a third (155), and the three notches have different length. When the first detent for controlling the sun gears is OFF, the second and the third detent are ON, and when the first and the second detent are OFF, the third detent is ON. A second control rod (B1) controls the second ring (B) to rotate and positioned by moving horizontally, combined in the groove (70) of the fix shaft (7) as the first control rod (A1) is. The second control rod (B1) has the other end pushed by a second spring (B2) to fit in and move along a second annular surface (8B) of the flat protruding wheel (8).

Figure 9:
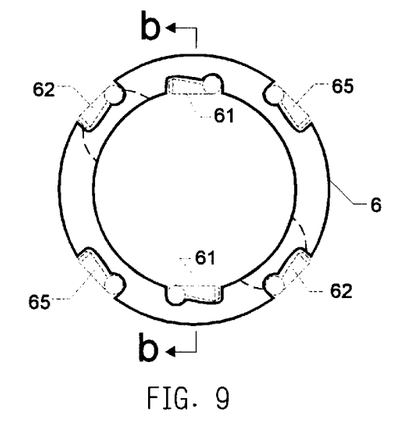
FIG. 9 is a front view of a middle ring (6) in the present invention.
Figure 10:
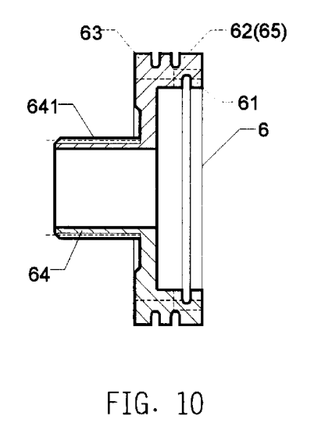
FIG. 10 is a cross-sectional view of the line b—b in FIG. 9.
Figure 11:
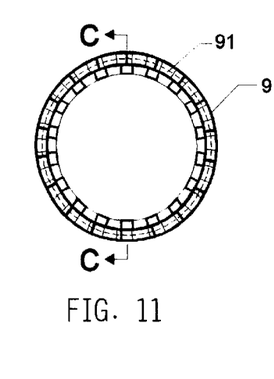
FIG. 11 is a front view of an interactive slide ring (9) in the present invention.
Figure 12:
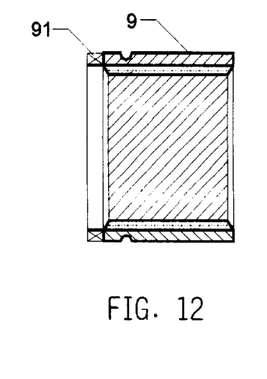
FIG. 12 is a cross-sectional view of the line c—c in FIG. 11.
Figure 13:
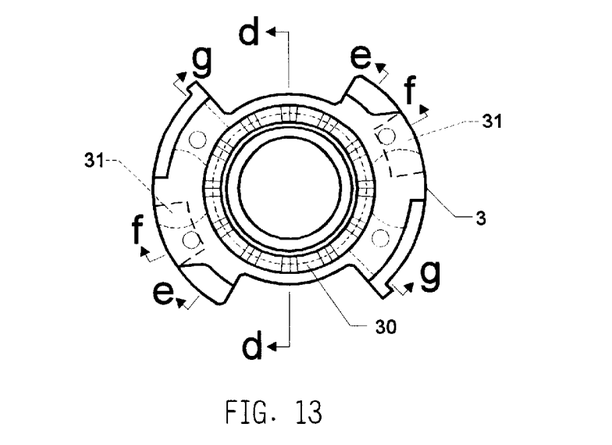
FIG. 13 is a font view of a post frame of the inner brake in the present invention.
Figure 14:
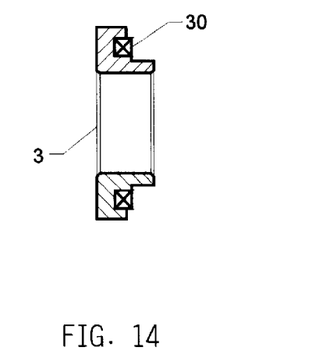
FIG. 14 is a cross-sectional view of the line d—d in FIG. 13.
Figure 15:
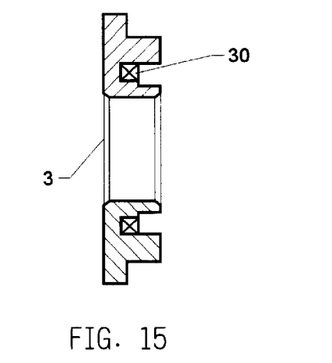
FIG. 15 is a cross-sectional view of the line e—e in FIG. 13.
Figure 16:
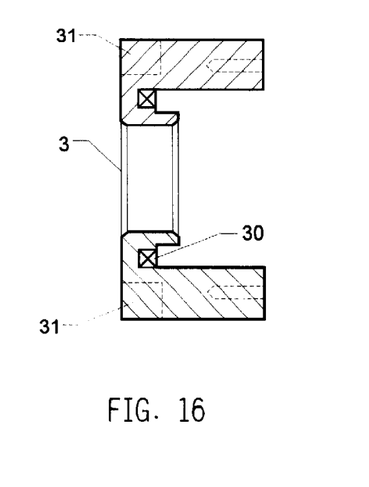
FIG. 16 is a cross-sectional view of the line f—f in FIG. 13.
Figure 17:
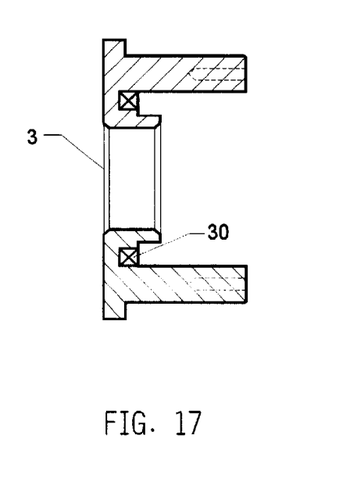
FIG. 17 is a cross-sectional view of the line g—g in FIG. 13.

The middle ring (6) is located in the hub (1) between the output end of the planetary gear frame (131), the output end of the inner gear (14) and the input end of the inner derailleur, as shown in FIGS. 9 and 10. The input end of the middle ring (6) has a detent (61) in its inner edge, engaging the engage section (133) of the output end of the planetary gear frame (131), and a clockwise direction detent (62) and a reverse direction detent (65) on an outer edge selectably engaging the engage section (143) of the output of the inner gear (14). The output end of the middle ring (6) a single direction output detent (63) engaging and moving with the hub (1), and connected to a male threaded cylinder (64), which has a slanting tooth 641 engaging an interactive slide ring (9), which moves to rotate the post frame (3) of the inner derailleur to rotate to perform braking action.

The detent (62) of the input end of the middle ring (6) is controlled by a third ring (C) to become ON or OFF against the engage section (143) of the output end of the inner gear (14). The third ring C) is moved horizontally by a third control rod (C1) moving horizontally, and the third control rod (C1) is fixed in the groove (70) of the fix shaft (7), and the other end of the third control rod (C1) is pushed by a third spring (C2) to fit in and move along a third annular surface (8C) on the flat protruding wheel (8).

Figure 22:
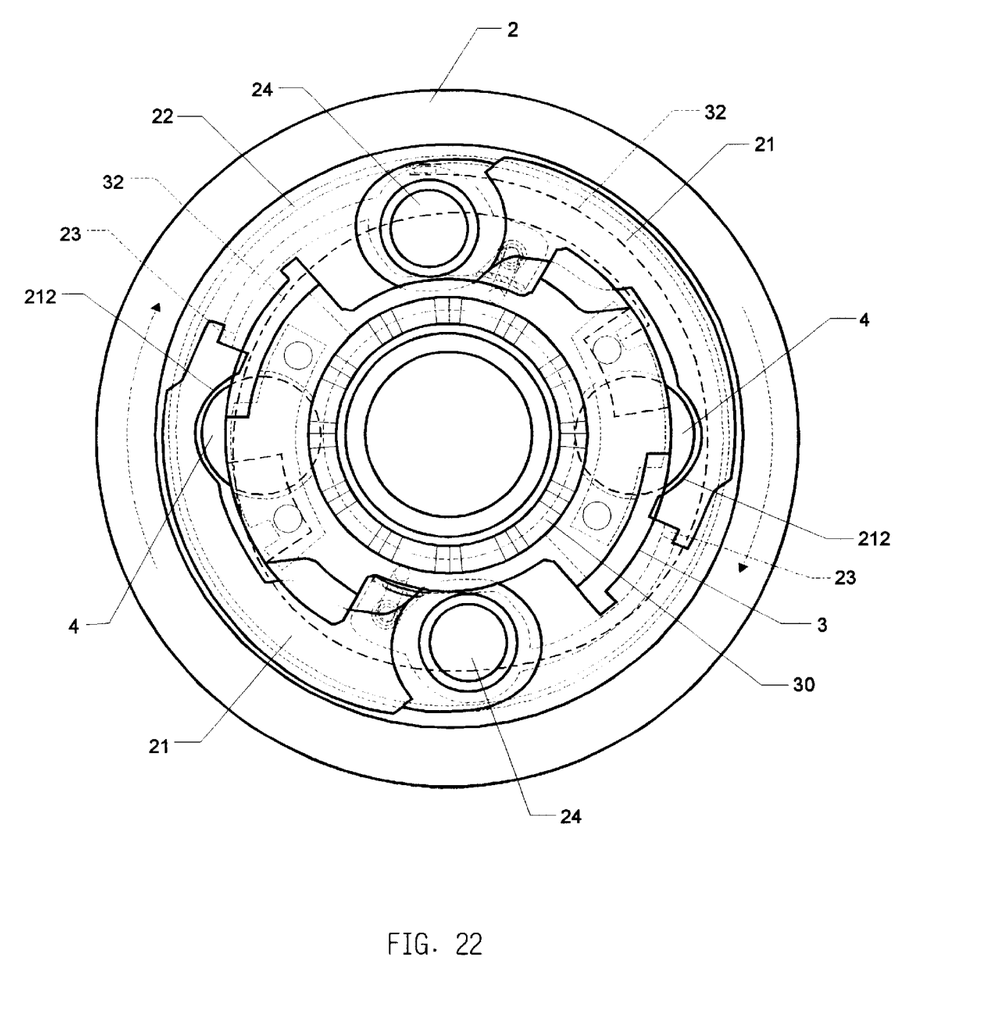
FIG. 22 is a cross-sectional view of an inner brake in the present invention.

The male threaded cylinder (64) of the output of the middle ring (6) is connected and moves with the interactive slide ring (9), which may produce horizontal outward movement to engage and move with the post frame (3) of the inner derailleur to perform braking function in case of reverse direction pedaling. As shown in FIGS. 11, 12, 13, 14, 15, 16 and 17, the post frame (3) has one side provided with an engage section (30) to engage and move with a engage section (90) of the interactive slide ring (9) and plural movable posts (4) (as shown in FIGS. 1 and 22), and the post frame (3) has more than one connect holes (31) in an outer end to fix interactive plate (3A) of a hand brake to move and rotate to let the post frame rotate at the same time to perform braking action. The immovable brake hub (2) surrounds the post frame (3) and plural braking plates (21) are located between the brake hub (2) and the posts 4. Each brake plate (21) has one end fixed and the other end pushed by the posts 4 to move outward to rub with the brake hub (2). The post frame (3) has a recover spring 22) to pull the post frame (3) back to its original position after rotated to perform braking action. Each brake plate (21) also has a recover spring (22) to let the brake plate normally not contact the brake hub (2), and contact normally a position block 23 in the inner derailleur so as not to contact the posts (4). Each brake plate (21) has one end provided with a position hole (211) for a position post (24) fixed on the side end cap (5) to fit therein, a curved surface (212) formed in an inner edge for the posts (4) to push.

Figure 18:
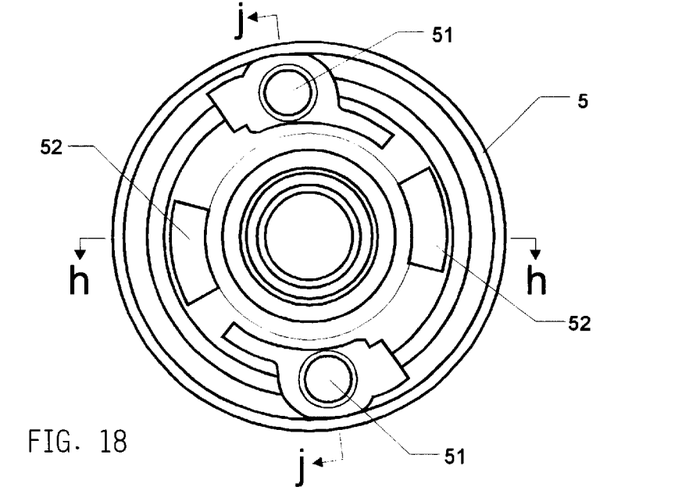
FIG. 18 is a front view of a side end cap in the present invention.
Figure 19:
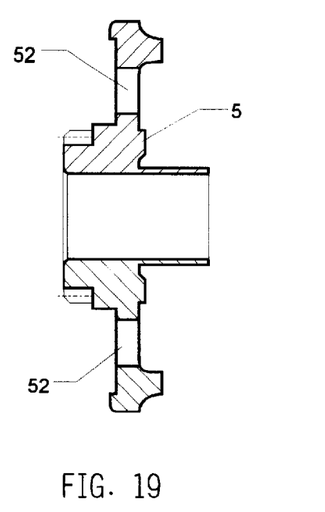
FIG. 19 is a cross-sectional view of the line h—h in FIG. 18.
Figure 20:
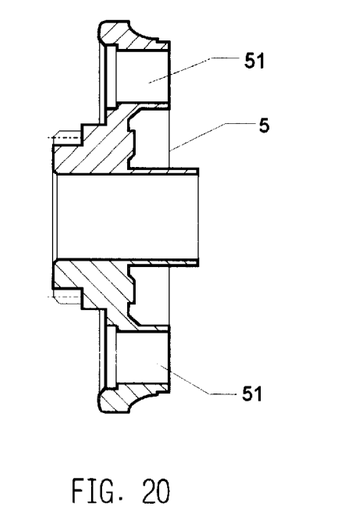
FIG. 20 is a cross-sectional view of the line j—j in FIG. 18.
Figure 21:
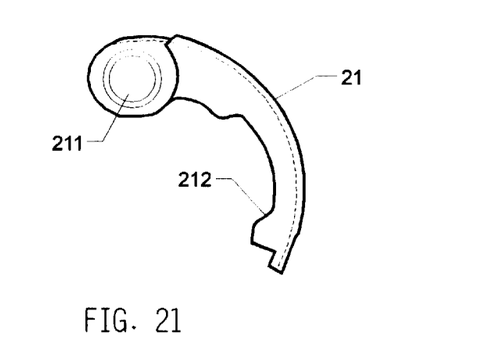
FIG. 21 is a front view of a brake member in the present invention.

A side end cap 5 is provided at a side end of the inner derailleur in the hub (1), as show in FIGS. 18, 19, 20, having at least two groups of combined holes 51 for the position posts (24) to fit therein, and at least two through holes (52) for the interactive block (3B) of the interactive plate (3A) to extend through and also in the connect hole (31) of the post frame (3), as shown in FIG. 1.

Next, as shown in FIGS. 1 and 22, when the pedal is pressed in a reverse direction, the reverse direction power is transmitted via the power input member (11) to push horizontally in the reverse direction and engage and move the tooth 142) of the inner gear (14). Then the engage section (143) of the inner gear (14) and the reverse direction detent (65 of the output end of the middle ring (6) transmit the reverse direction power to the interactive slide ring (9), letting the interactive slide ring (9) horizontally move to engage the engage section (30) of the post frame (3) owing to reverse rotation of the middle ring (6). Then the post frame (3) is rotated to force the posts (4) push the brake plates (21) to produce braking function. When the reverse direction power disappears, the post frame (3) is pulled back to its original position by the spring (32), canceling braking action. In addition, when the interactive plate (3A) of a hand brake is added to the aside end cap (5) of the inner brake, the hand brake may pull the interactive plate (3A) to rotate, forcing the interactive block (3B) move the post frame (3) rotate to produce braking function.

In general, the invention has two kinds of braking modes, by pedaling reversely to produce reverse direction power input and by pulling the hand brake. The reverse power input route begins from the power input member (11) to move horizontally in reverse direction the reverse direction power output slide ring (111), which then directly engages and moves the inner gear (14), which then has the engage section of its output end engage the reverse direction detent (65) of the input end of the middle ring (6), which then pushes the interactive slide ring (9) move horizontally to engage the post frame (3) to rotate to produce braking function.

While the preferred embodiment of the invention has been described above, it will be recognized and understood that various modifications may be made therein and the appended claims are intended to cover all such modifications that may fall within the spirit and scope of the invention.

I claim:

1. A double use inner brake and an inner derailleur comprising a power input member (11) of an inner derailleur, a reverse direction power output slide ring (111), an output select ring (12), a planetary gear (13), a planetary gear frame (131), an inner gear (14), a sun gear group, a brake hub (2) of an inner brake, plural brake plates (21), a post frame (3), plural posts (4), a side end cap (5), a middle ring (6) located between the output end of said inner derailleur and said post frame (3), a fix shaft (7), a flat protruding wheel (8) of handling speed change, plural speed control rods and plural rings;

said power input member (11) having a slanting tooth at an output end to engage and move with said reverse direction power slide ring (111), said power input member (11) only engaging and moving with said output select ring (12) when said power input member rotates in a clockwise direction;

said reverse direction power output slide ring (111) having a slanting tooth at an input end engaging said slanting tooth of said power input member, a first tooth (113) at the output end engaging said output select ring (12), said slide ring (111) moving out horizontally to let the first tooth (113) and a second tooth (114), at the output end, respectively engage said output select ring (12) and said inner gear (14) when the power input member (11) rotates in a reverse direction;

said planetary gear (13) located on said planetary gear frame, engaging said plural sun gears (15), (151), (152) and rotating around the fix shaft (7), said planetary gear frame having an engage section (132) at an output end engaging an engage section (121) of the output end of said output select ring (12), said output to select ring (12) having a detent (122) at the input end selectably engaging and moving with an engage section (141) of said inner gear (14), said inner gear having a tooth (142) at the input end to engage the tooth (114) of said slide ring (111), said planetary gear frame having an engage section (133) to engage a detent (61) at an outer edge of the input end of said middle ring (6), said inner gear (14) having an engage section (143) at the output end to engage a clockwise direction detent (62) or a reverse direction detent (65);

said output select ring (12) having a detent (122) at the output end controlled by a first ring (A) to become ON or OFF, a first control rod (A1) moving said first ring (A) horizontally and fixed in a groove on an outer surface of said fix shaft (7), the other end of said first control rod pushed by a first spring (A2) to move along on a first annular surface (8A) on said flat protruding wheel (8) of the speed change structure (80), said first control rod (A1) moving along a high and a low portion of said annular surface (8A) to move said first ring (A) to make said detent (122) ON or OFF;

a second ring (B) controlling said sun gears (15), (151), (152) having three notches respectively controlling a first detent (153), a second detent (154), and a third detent (155), a second control rod (B1) moving horizontally to control said first ring to rotate and fixed in said groove of said fix shaft (7), the other end of said second control rod pushed by a spring and guided by a gear (B3) and a rack (B4) and moving along a second annular surface (8B) of said flat protruding wheel (8);

said middle ring (6) located in between said hub (1), the output end of said planetary gear frame (131), the output end of said inner gear (14) and the input end of said inner derailleur, having a clockwise direction detent (61) on an outer edge of the input end to engage an engage section (133) of the output end of said planetary gear frame (131), a clockwise direction detent (62) and a reverse direction detent (65) on an outer edge of the input end selectably engaging an engage section (143) of the output end of said inner gear (14), said middle ring (6) having a single direction output detent (63) at the output end to engage and move with said hub (1), said outer end connected to a male threaded cylinder (64), said male threaded cylinder (64) having a slanting tooth engaging said interactive slide ring (9), said interactive slide ring moving to rotate said post frame (3) to perform braking function;

said detent of the input end of said middle ring (6) controlled by a third ring (C) to become ON or OFF, located to engage said engage section (143) of said inner gear (14), a third control rod (C) moving horizontally to move said third ring (C) horizontally and fixed in said groove of said fix shaft (7), the other end of the third control rod (C1) pushed by a third spring (C2) to fit in and move along a third annular surface (8C) of said flat protruding wheel (8);

the output end of said middle ring (6) connected to said male threaded cylinder (64) to move said interactive slide ring (9) which moves outward horizontally and engages and rotates said post frame (3) to perform braking function in case of reverse direction movement; said post frame (3) having one side provided with an engage section (30) to engage an engage section (91) of said interactive slide ring (9), and said post frame (3) having plural movable posts;

said post frame (3) having at least more than one connect holes (31) in an outer side end for connecting said interactive plate (3A) to move and rotate said post frame (3) for performing hand braking;

said brake hug (2) fixed immovable around said post frame (3), said plural brake plates positioned between said brake hub and said posts frame (4) of said post frame (3), each brake plate having one end provided with a position hole (211) to be secured at that end, and a curved surface formed in an inner edge for said posts (4) to push;

said side cap (5) having at least two combine holes (51) for said position posts (24) of said brake plates to fit therein, and at least two through holes (52) for an interactive block (3B) of said interactive plate (3A) to protrude through and in said connect holes (31) of said post frame (3).

2. The double use inner brake and an inner derailleur for bikes as claimed in claim 1, wherein said power input member (11) pushes said reverse direction power output slide ring (111) horizontally to engage and move with said tooth (142) of the input end of said inner gear (14) and then via said engage section (143) of the inner gear (14) and said reverse direction detent (65) of the middle ring, transmitting reverse power to said interactive slide ring (9), letting said interactive slide ring move out horizontally owing to reverse rotation of said middle ring (6) and engage said engage section (30) of said post frame (3), which is then rotated to force said posts (4) push said brake plates (21) to produce braking function, when the pedal is stepped reversely.

3. The double use inner brake and an inner derailleur as claimed in claim 1, wherein when said interactive plate (3A) is affixed on an outer surface of said side end cap (5), and if said hand brake is operated to rotate said interactive plate (3A), said interactive block (3B) of said interactive plate (3A) moves said post frame (3) rotate to produce braking function.

4. The double use inner brake and the inner derailleur as claimed in claim 1, wherein said post frame can be rotated by reverse power input by pedaling reversely and by operating said hand brake, controlled by two kinds braking modes.

5. A double use inner brake and an inner derailleur comprising an inner derailleur in a hub and a middle ring (6) located between an output end of said inner derailleur and a post frame (3) of an inner brake; said middle ring (6) located in between said hub, an output end of a planetary gear frame (131), an output end of an inner gear (14) and an input end of said inner brake, said middle ring having a detent (61) on an inner edge of an input end and engaging an engage section (133) of an output end of said planetary gear frame (131), and outer edge of an input end of said middle ring having a clockwise direction detent (62) and a reverse direction detent (65) selectably engaging an engage section (143) of the output end of said inner gear (14), the output end of said middle ring (6) having a single direction output detent (63) and connected to a male threaded cylinder (64) provided with a slanting tooth (641) engaging an interactive slide ring (9), said interactive ring moved to rotate said post frame (3) to perform braking action;

said post frame of said inner derailleur having one side provided with an engage section (30) to engage an engage section (91) of said interactive slide ring (9), said post frame having plural movable posts (4);

an immovable brake hub surrounding said post frame (3), plural brake plates (21) positioned between said brake hub (2) and said posts (4) and respectively having one end bored with a position hole (211) to secure that end, an inner edge of each said brake plate having a curved surface (212) for said posts (4) to push.

6. The double use inner brake and an inner derailleur for bikes as claimed in claim 5, wherein said brake hub has a side end cap (5) closing on a side end, said side end cap having at least two groups of combining holes (51) for position posts (24) to fit therein and at least two through holes (52) for an interactive block (3B) of an interactive plate (3A) to protrude through and in a connect hole (31) of said post frame (3).

7. The double use inner brake and an inner derailleur for bikes as claimed in claim 5, wherein said male threaded cylinder moves said interactive slide ring (9) to move outward horizontally to engage said post frame to rotate to produce braking function in case of pedaling reversely.

8. The double use inner brake and an inner derailleur for bikes as claimed in claim 5, wherein said post frame (3) has at least more than one connect hole (31) in an outer side end for said interactive plate (3A) to move and rotate said post frame (3) to perform braking in case of a band brake pulled to move said interactive plate (3A).

9. The double use inner brake and an inner derailleur for bikes as claimed in claim 5, wherein said inner gear has an engage section provided at an input end to receive reverse direction power input, which is then transmitted via an output end of said inner gear to said inner brake.

10. The double use inner brake and an inner derailleur for bikes as claimed in claim 5, wherein said post frame of said inner brake is controlled by reverse direction power input by reverse pedaling and by pulling a hand brake.

\* \* \* \* \*